United States Patent [19]
Bridges et al.

[11] Patent Number: 5,527,517
[45] Date of Patent: Jun. 18, 1996

[54] LIQUID SCRUBBING OF GAS-PHASE CONTAMINANTS

[75] Inventors: Charles T. Bridges, Midlothian; Charles R. Howe, Richmond; John B. Paine, III, Midlothian; Kenneth F. Podraza, Richmond, all of Va.

[73] Assignees: Philip Morris Incorporated, New York, N.Y.; Philip Morris Products, Inc., Richmond, Va.

[21] Appl. No.: 346,259

[22] Filed: Nov. 23, 1994

[51] Int. Cl.$^6$ .......................... B01D 53/52; B01D 53/46; B01D 53/78
[52] U.S. Cl. ............................................ 423/210; 423/224
[58] Field of Search ........................... 423/210, 224

[56] References Cited

U.S. PATENT DOCUMENTS

| | | | |
|---|---|---|---|
| 2,908,546 | 10/1959 | Szatkowski | 423/224 |
| 3,617,567 | 11/1971 | Mathre | 204/55 |
| 4,059,048 | 11/1977 | Dickson | 99/482 |
| 4,144,119 | 3/1979 | Dutkewych et al. | 252/79.4 |
| 4,370,306 | 1/1983 | Kirchner et al. | 423/224 |
| 4,729,835 | 3/1988 | McNeillie et al. | 423/224 |
| 5,098,664 | 3/1992 | Schellhaas et al. | 422/108 |
| 5,207,877 | 5/1993 | Weinberg et al. | 204/130 |

FOREIGN PATENT DOCUMENTS

| | | | |
|---|---|---|---|
| 50-151788 | 12/1975 | Japan | 423/210 |
| 63-209736 | 8/1988 | Japan | |
| 62-44864 | 8/1988 | Japan | 423/210 |
| 1-266836 | 10/1989 | Japan | 423/210 |
| 6-238124 | 8/1994 | Japan | 423/210 |

OTHER PUBLICATIONS

Official Translation of JP-63-209,736, Kokai first published 31 Aug. 1988.
Perry, R. H., ed. "Chemical Engineers' Handbook," McGraw Hill: New York (1973) pp. 18-50 and 18-72.
Cotton, F. A., et al. "Advanced Inorganic Chemistry", Wiley-Interscience (1980), p. 156.

*Primary Examiner*—Steven Bos
*Assistant Examiner*—Peter DiMauro
*Attorney, Agent, or Firm*—James E. Schardt

[57] ABSTRACT

A main aspect of this invention is the provision of a liquid medium for scrubbing contaminants from an environmental gas-phase. Toxic chemicals such as phosphine and arsine are removed from a gas-phase stream by contacting the gas-phase stream with an aqueous medium which oxidizes the contaminants to water-soluble or water-dispersible type derivatives. The aqueous medium has a content of redox ingredients illustrated by compounds such as silver nitrate, hydrogen peroxide, sodium tungstate, and sulfuric acid.

20 Claims, No Drawings

LIQUID SCRUBBING OF GAS-PHASE CONTAMINANTS

BACKGROUND OF THE INVENTION

Environmental protection is of increasing concern in the United States and other developed nations. Control of airborne pollutant accumulation is an instituted goal of strict government regulations.

Methods of pollutant removal from air include adsorption on particulate solids such as activated carbon, absorption in liquid media, filtration, electrostatic precipitation, incineration, chemical reaction, condensation, and the like.

Aqueous solutions are utilized to absorb toxic gases such as HCl, HF, $NH_3$, $Cl_2$ and $H_2S$. Chemical means of air decontamination include oxidation of toxic chemicals with oxidizing agents such as chlorine, chlorine dioxide, hypochlorite, ozone, peroxide, and the like.

Both physical and chemical methods of air decontamination have various drawbacks. Many of the methods involve the use of chemical reagents which per se are hazardous to humans. A major concern with decontamination methods is the creation of a toxic waste disposal problem.

Of particular interest with respect to the present invention are industrial operations in which highly toxic gases such as phosphine, arsine or hydrogen sulfide are released into the environment.

Phosphine has become a fumigant of choice for foodstuffs, tobacco and related materials because of low cost and ready availability, and its comprehensive pesticidal activity. Phosphine gas typically is generated at point of use by exposure of magnesium phosphide or aluminum phosphide to ambient humidity:

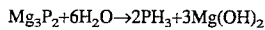

$$Mg_3P_2 + 6H_2O \rightarrow 2PH_3 + 3Mg(OH)_2$$

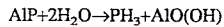

$$AlP + 2H_2O \rightarrow PH_3 + AlO(OH)$$

Release of phosphine gas into the atmosphere must be minimized or prevented because of its toxicity. The tobacco industry mainly has employed silver-impregnated carbon as an adsorbent for phosphine. This type of adsorbent is limited by the amount of phosphoric acid oxidation byproduct which it can accumulate before deactivation occurs, and the silver catalyst needs to be regenerated or replaced.

Phosphine also is employed in the semiconductor industry. JP 63-87519 discloses flame combustion as a means of phosphine removal from air. U.S. Pat. No. 5,024,823 discloses the use of copper sulfate-impregnated silica gel or alumina to absorb phosphine.

U.S. Pat. No. 5,207,877 discloses a liquid scrubber which uses a redox pair of oxidant metals to oxidize and destroy volatile organic compounds or airborne microorganisms. The oxidant metals are reoxidized by electrochemical means.

The electronics industry also utilizes arsine gas in the manufacture of semiconductors. Scrubber solutions which use permanganate or hypochlorite reagents to remove arsine or phosphine contaminants from environmental air are not economical, and pose a toxic waste disposal problem.

There is a continuing need for new and improved methods and systems for removal of toxic contaminants from environmental air.

Accordingly, it is an object of this invention to provide a liquid scrubber system which is adapted for efficient removal of contaminants from air or gas by oxidation of the contaminants to water-soluble derivatives, and/or to water-dispersible derivatives which remain associated with the aqueous phase.

It is another object of this invention to provide a process for oxidative removal of phosphine and other toxic contaminants from a gas-phase by the use of a scrubber solution which includes a content of redox-effective quantities of silver(I) catalyst, hydrogen peroxide, and a metal co-catalyst which promotes reoxidation of silver metal.

Other objects and advantages of the present invention shall become apparent from the accompanying description and Examples.

DESCRIPTION OF THE INVENTION

One or more objects of the present invention are accomplished by the provision of a process for liquid scrubbing of a phosphine-containing gas-phase which comprises (1) forming a gas-phase stream from a contaminated gas-phase which has a content of phosphine; (2) contacting the gas-phase stream with an aqueous medium which contains redox-effective quantities of (a) silver(I) oxidation catalyst, (b) hydrogen peroxide oxidant, (c) silver metal-reoxidation co-catalyst ingredient, and (d) oxidation-resistant acid; and (3) recovering a purified gas-phase stream which has a reduced content of phosphine contamination.

In terms of chemical reactivity, silver(I) catalyst ions start the oxidation process by capturing the phosphine from the gas-phase. The silver(I) catalyst ingredient is effective for promoting the oxidation of phosphine or other gas-phase contaminants to oxygenated derivatives which are water-soluble and/or water-dispersible derivatives which remain associated with the aqueous medium. The silver(I) ions initially are reduced to silver metal in the redox system.

The hydrogen peroxide ingredient is the ultimate oxidant in the redox system. It provides the electromotive potential for oxidation of phosphine and other contaminants, and for reoxidation of silver metal to silver(I) ions.

The co-catalyst ingredient comprises one or more metal compounds which promote reoxidation of silver metal to silver(I) ions.

The oxidation-resistant acid ingredient promotes redox transitions, and enhances the solubility or dispersion of chemical constituents in the aqueous medium. The oxidation-resistant acid can be incorporated initially in the aqueous medium, and/or it can be generated in situ during the operation of the process.

The term "gas-phase" as employed herein refers to a gasiform medium such as air, nitrogen, helium, argon, carbon dioxide, and the like. A carbon dioxide gas-phase can be employed, since the carbon dioxide is not absorbed in the acidic medium as it is in an alkaline medium.

The term "ingredient" as employed herein refers to an entity which can comprise a single chemical compound or a mixture of chemical compounds.

The process typically is operated under temperature conditions as encountered in industrial scale operations. The invention process can be operated effectively at ambient temperatures which may range between about 5°–55° C. in manufacturing plants or warehouses under seasonal conditions in varied climates.

For example, it is desirable to effect decontamination of spent fumigation atmospheres which are vented from tobacco warehouses and which have a content between about 5–600 ppm of phosphine. A typical tobacco warehouse fumigation atmosphere has 200–350 ppm content of phosphine gas. A tobacco warehouse of 500,000 cubic feet capacity under fumigation conditions nominally contains 170 moles (12.8 pounds) of phosphine (at 300 ppm and 30° C.).

In other applications, phosphine is employed extensively for fumigation of grains and other foodstuffs. The present invention provides a novel means for decontamination of spent fumigation atmospheres vented from foodstuff storage facilities.

In contrast to warehouse type fumigations, vented volumes of contaminated air or gas in the semiconductor industry are significantly smaller, but levels of contaminants such as phosphine or arsine can be in a higher concentration range, such as between about 20–1000 ppm. These more heavily contaminated volumes of vented gas-phase can be processed in accordance with the present invention by ready adjustment of reagent concentration, flow rates of gas and liquid streams, and the like, as effective for complete removal of contaminants.

The process has application for purification of a gas-phase environment which has a phosphine content ranging between about 0.3–17,900 ppm.

In practice, the present invention process involves a recirculating aqueous scrubber solution which has a redox-effective content of ingredients which include a silver(I) compound, hydrogen peroxide, an oxidation-resistant mineral acid, and a metal co-catalyst preferably selected from tungsten(VI), vanadium(V), vanadium(IV), molybdenum(VI), titanium(IV), niobium(V), iron(III) and uranium(VI) compounds.

The term "redox-effective" as employed herein refers to an integrated functionality of metal compounds which provides efficient cascade oxidation of a contaminant such as phosphine, and regeneration of a reduced metal catalyst to its original oxidative potential.

A silver(I) compound ingredient reacts directly and rapidly with a contaminant gas such as phosphine, and the contaminant gas is oxidized to a water-soluble byproduct such as orthophosphoric acid ($H_3PO_4$).

The following equations are a simplified representation of the underlying complex chemistry. As illustrated in the equations, silver metal is formed from the silver(I) ions (equation A). The silver metal reacts with hydrogen ions and hydrogen peroxide to regenerate the silver(I) ions. The process is catalytic with respect to silver(I) ions, so that the ultimate electromotive potential for phosphine oxidation derives from the hydrogen peroxide (equation B).

$$PH_3 + 8AgNO_3 + 4H_2O \rightarrow H_3PO_4 + 8Ag(O) + 8HNO_3 \qquad (A)$$

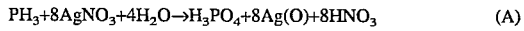

$$8Ag(O) + 8HNO_3 + 4H_2O_2 \rightarrow 8AgNO_3 + 8H_2O \qquad (B)$$

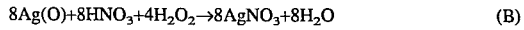

The metal co-catalyst ingredient in the aqueous formulation accelerates the reoxidation of the silver metal by the hydrogen peroxide. By accelerating the reoxidation of silver metal, the quantity of silver(I) compound required to oxidize a given quantity of phosphine is minimized. In the absence of a co-catalyst ingredient, phosphine can overwhelm the silver content of the treatment system, and cause precipitation of enough silver catalyst to permit phosphine gas to escape unscrubbed from a vented air stream.

A preferred type of metal co-catalyst ingredient is one which forms a cyclic complex (chelate) with the peroxide ligand in aqueous solution. Of the co-catalyst metals, tungsten is the most preferred, followed by vanadium and molybdenum. Tungsten appears to be the most powerful activator of hydrogen peroxide, and causes only low levels of wasteful catalytic disproportionation of hydrogen peroxide to water and molecular dioxygen. Vanadium is more destructive of hydrogen peroxide, particularly as the hydrogen ion concentration increases.

The chemical conversions in the invention process perform as an oxidative cascade. Thus, hydrogen peroxide appears to form one or more strong oxidizing complexes with the co-catalyst metal(s), with the possible exception of iron(III). The co-catalyst complex oxidizes the silver metal to silver(I) ion, and the silver(I) ion is capable of oxidizing phosphine to orthophosphoric acid. Although silver(I) ion is capable of oxidizing phosphine with the overall approximate stoichiometry depicted in equation A, it is probable that hydrogen peroxide or peroxy-metal complexes react directly with phosphorus-containing intermediates between phosphine and orthophosphoric acid. Such direct reactions are capable of proceeding in parallel with the direct oxidation by silver(I) ion.

The end product of phosphine oxidation is orthophosphoric acid, and the ultimate source of oxygen is the hydrogen peroxide. This is expressed by equation C, which may be considered to be the sum of equations A and B, where the recycled components cancel out, and only the components that undergo a net change remain:

$$PH_3 + 4H_2O_2 \rightarrow H_3PO_4 + 4H_2O \qquad (C)$$

The silver(I) catalyst and the metal co-catalyst are regenerated continuously by the oxidative cascade of the invention process, and the catalysts can be recycled indefinitely. It is an important advantage of the present invention process that a large amount of a contaminant gas such as phosphine or arsine can be removed from vented gas-phase streams with the commitment of relatively small quantities of precious metals such as silver.

Depending on the contaminant type and concentration in a vented gas-phase stream, an invention aqueous scrubber solution can have a content of silver(I) catalyst ingredient in a concentration between about 0.001–10 molar, and preferably between about 0.02–0.2 molar. Suitable silver(I) catalyst species include water-soluble compounds such as silver nitrate, silver sulfate and silver fluoride; and normally water-insoluble species such as silver oxide, silver carbonate, silver phosphate and silver metal which can dissolve in an acidic aqueous medium.

An invention aqueous scrubber solution can have a hydrogen peroxide concentration between about 0.01–18 molar, and preferably between about 1–5 molar.

The metal co-catalyst ingredient concentration in a scrubber solution can be between about 0.0001–0.3 gram-atoms per Liter of metal ions, and preferably between about 0.001–0.05 gram-atoms per Liter of metal ions, depending on the number and concentration of contaminants being removed.

For the removal of phosphine contaminant, a preferred co-catalyst ingredient is between about 0.0001–0.2 (preferably between about 0.001–0.05) gram-atoms per Liter of tungsten ions derived from at least one compound selected from the group consisting of sodium tungstate dihydrate, tungsten trioxide, tungstic acid, and phosphotungstic acid.

Another preferred co-catalyst ingredient is between about 0.0001–0.05 (preferably between about 0.001–0.02) gram-atoms per Liter of vanadium ions derived from at least one compound selected from the group consisting of vanadyl sulfate, ammonium metavanadate, divanadium pentoxide, and vanadium phosphate.

Another preferred co-catalyst ingredient is between about 0.0001–0.2 (preferably 0.001–0.05) gram-atoms per Liter of molybdenum ions derived from at least one compound selected from the group consisting of sodium molybdate dihydrate, molybdenum trioxide, phosphomolybdic acid, ammonium molybdate, and molybdic acid.

Another preferred co-catalyst ingredient is between about 0.0001–0.2 (preferably between about 0.001–0.05) gram-atoms per Liter of titanium ion as derived from compounds such as titanium oxysulfate-sulfuric acid complex. Water-soluble fluorotitanate complexes, such as ammonium hexafluorotitanate, are less effective as a source of catalytically-active titanium in the practice of the present invention.

The presence of an oxidation-resistant acid is an essential feature of a preferred type of present invention aqueous scrubber solution. The term "oxidation-resistant" as employed herein refers to a strong mineral acid type of chemical reagent such as orthophosphoric acid, sulfuric acid, nitric acid, tetrafluoroboric acid, hexafluorophosphoric acid, perchloric acid, fluorosulfonic acid, trifluoroacetic acid, trifluoromethanesulfonic acid, hydrofluoric acid, hexafluorosilicic acid, and the like, and mixtures thereof.

Preferably, the oxidation-resistant mineral acid ingredient is between about 0.01–9 molar concentration of orthophosphoric acid, or between about 0.05–2 molar concentration of sulfuric acid, or between about 0.1–4 molar concentration of nitric acid, or any mixture thereof.

Effective scrubber solutions can be prepared without the initial addition of an oxidation-resistant mineral acid ingredient, but scrubber efficiency is improved significantly when a mineral acid is present. As elaborated in the present specification, practice of the present invention process typically generates a mineral acid in situ. The presence of a mineral acid enhances the rate of silver metal reoxidation. Strong mineral acids such as nitric acid or sulfuric acid provide further advantage by maintaining reagents and reactive intermediates dissolved in the aqueous medium.

It is a significant aspect of the present invention that the oxidative removal of phosphine from a vented gas stream provides an accumulation of orthophosphoric acid in the aqueous scrubber solution as the treatment system is operated continuously. The acidity of the accumulated orthophosphoric acid tends to enhance the kinetics of the cascade oxidation chemistry.

In a further embodiment this invention provides a novel type of composition which yields superior results in comparison with prior art methods for contacting and purifying a gas-phase stream by oxidation of a contaminant. An invention composition comprises an aqueous medium which contains redox-effective quantities of (a) silver(I) oxidation catalyst ingredient, (b) hydrogen peroxide ingredient to oxidize the contaminant to a water-soluble or water-dispersible derivative, (c) metal co-catalyst ingredient which promotes re-oxidation of silver metal, and preferably (d) oxidation-resistant acid.

A present invention aqueous scrubber solution is readily applicable for purifying a gas-phase stream by removal of at least one contaminant selected from the group consisting of phosphine, arsine, stibine, hydrogen selenide, hydrogen telluride, hydrogen sulfide, diborane, germane, and silane.

In one specific composition embodiment, the present invention provides a liquid medium for oxidation of gas-phase chemical compounds which consists of an aqueous medium having a redox-effective content of ingredients comprising (1) between about 0.02–0.2 molar concentration of silver nitrate; (2) between about 1–5 molar concentration of hydrogen peroxide, (3) between about 0.001–0.05 molar concentration of sodium tungstate; (4) between about 0.2–2 molar concentration of nitric acid; and (5) between about 0–9 molar concentration of phosphoric acid.

In another specific composition embodiment, the present invention provides a liquid medium for oxidation of gas-phase chemical compounds which consists of an aqueous medium having a redox-effective content of ingredients comprising (1) between about 0.02–0.2 molar concentration of silver nitrate; (2) between about 1–5 molar concentration of hydrogen peroxide; (3) between about 0.001–0.05 molar concentration of sodium tungstate; (4) between about 0.2–2 molar concentration of sulfuric acid; and (5) between about 0–9 molar concentration of phosphoric acid.

In another specific composition embodiment, the present invention provides a liquid medium for oxidation of gas-phase chemical compounds which consists of an aqueous medium having a redox-effective content of ingredients comprising (1) between about 0.01–0.1 molar concentration of silver sulfate; (2) between about 1–5 molar concentration of hydrogen peroxide; (3) between about 0.001–0.05 molar concentration of sodium tungstate; (4) between about 0.2–2 molar concentration of sulfuric acid; and (5) between about 0–9 molar concentration of phosphoric acid.

In another specific composition embodiment, the present invention provides a liquid medium for oxidation of gas-phase chemical compounds which consists of an aqueous medium having a redox-effective content of ingredients comprising (1) between about 0.02–0.2 molar concentration of silver nitrate; (2) between about 1–5 molar concentration of hydrogen peroxide; (3) between about 0.001–0.05 molar concentration of sodium tungstate; and (4) between about 0.1–9 molar concentration of phosphoric acid.

In another specific composition embodiment, the present invention provides a liquid medium for oxidation of gas-phase chemical compounds which consists of an aqueous medium having a redox-effective content of ingredients comprising (1) between about 0.02–0.2 molar concentration of silver nitrate; (2) between about 1–5 molar concentration of hydrogen peroxide; (3) between about 0.001–0.02 molar concentration of at least one of vanadyl sulfate and ammonium metavanadate; and (4) between about 0.1–3 molar concentration of phosphoric acid.

In another specific composition embodiment, the present invention provides a liquid medium for oxidation of gas-phase chemical compounds which consists of an aqueous medium having a redox-effective content of ingredients comprising (1) between about 0.02–0.2 molar concentration of silver nitrate; (2) between about 1–5 molar concentration of hydrogen peroxide; (3) between about 0.001–0.05 molar concentration of sodium molybdate dihydrate; (4) between about 0.2–2 molar concentration of nitric acid; and (5) between about 0–9 molar concentration of phosphoric acid.

In another specific composition embodiment, the present invention provides a liquid medium for oxidation of gas-phase chemical compounds which consists of an aqueous medium having a redox-effective content of ingredients comprising (1) between about 0.02–0.2 molar concentration of silver nitrate; (2) between about 1–5 molar concentration of hydrogen peroxide; (3) between about 0.001–0.05 molar concentration of sodium tungstate; (4) between about 0.0001–0.02 molar concentration of at least one of vanadyl sulfate and ammonium metavanadate; and (5) between about 0.1–3 molar concentration of phosphoric acid.

In a further specific composition embodiment, the present invention provides a liquid medium for oxidation of gas-phase chemical compounds which consists of an aqueous medium having a redox-effective content of ingredients comprising (1) between about 0.02–0.2 molar concentration of silver nitrate; (2) between about 1–5 molar concentration of hydrogen peroxide; (3) between about 0.001–0.05 gram-atoms per Liter of titanium(IV) derived from titanium oxysulfatesulfuric acid complex; (4) between about 0.2–2 molar concentration of nitric acid; and (5) between about 0–9 molar concentration of phosphoric acid.

A present invention aqueous scrubber solution can be contacted with a contaminated gas-phase stream by means of conventional equipment such as a sprayer-tower, packed column, sprayer-box, sparger unit, Venturi aspirator, and the like. As illustrated in the Examples, counter-current contact in a packed column, or the use of a sparger unit, are effective means for contacting an aqueous scrubber solution with a venting stream of contaminated atmospheric gas.

The practice of the present invention embodiments provides advantages of efficiency and reliability over the practiced methods of decontamination of a gas-phase volume. The chemistry of the invention process has inherently rapid kinetics which permits the removal of contaminants from a gas-phase stream under high linear flow conditions. It has been found that influent gas-phase flow of 1000 cfm can be completely scrubbed of phosphine (influent concentration of about 250 ppm) with a 2.5 foot diameter packed column (four feet bed) by a 25 gpm counterflow of a present invention aqueous scrubber liquid medium.

Little or no solids form during the operation of a present invention preferred embodiment for phosphine removal. Any solids that form usually redissolve when contact with phosphine has ceased.

Other advantages are provided by the presence of a strong mineral acid ingredient. Hydrogen ion favors the reoxidation of silver metal by hydrogen peroxide. High acidity also serves to help keep peroxy chelates and other constituents in solution, which otherwise tend to precipitate as silver salts.

Another advantage derives from the partial evaporation of water during the operation of the invention decontamination process. The volume of water evaporated during processing exceeds the volume of hydrogen peroxide that needs to be added to maintain an active concentration level. This permits a given aqueous scrubber formulation to be reused in successive runs for phosphine removal, before the eventual accumulation of orthophosphoric acid (up to about 9 moles per Liter) requires replacement of the reused aqueous scrubber solution.

As a further advantage, the chemistry of the invention process is self-indicating when the contaminant being removed is phosphine. In a packed-bed mode, a dark color is evident in the input zone where the steady-state phosphine concentration gradient is non-zero. The contiguous zone of the bed remains light-colored where the phosphine concentration of the contacting influent gas phase is zero. Subsequently, the dark-colored zone of the bed fades, and any precipitated solids dissolve, when the aqueous scrubber solution with a content of hydrogen peroxide is recycled without contact with phosphine gas, or when the phosphine gas has been depleted to a low level in the influent gas stream as a result of continuous scrubbing action. The dark color of the aqueous scrubber solution also fades when phosphine is absent.

The following examples are further illustrative of the present invention. The components and specific ingredients are presented as being typical, and various modifications can be derived in view of the foregoing disclosure within the scope of the invention.

EXPLORATORY PROCEDURES

The reaction of phosphine with silver nitrate is a well known interaction. The success of a scrubber system based on this reaction depends on finding suitable catalysts for enhancing the reaction of silver metal with hydrogen peroxide, since it is desirable to target environment-friendly, low-cost hydrogen peroxide as the ultimate oxidant. To identify the most likely candidates for a successful catalyst, a series of small-scale experiments were performed, using a sparger/impinger system. The first candidate-metal catalyst explored was iron, because of its known promotion of hydrogen peroxide oxidations commonly referred to as "Fenton" chemistry. When iron was found to exhibit certain disadvantages (i.e., excessive decomposition of hydrogen peroxide at elevated temperatures), other metals were explored on a similar scale.

To screen systems for potential scale-up to large-size column scrubbers, a series of small-scale reactions were performed in a sparger system. A gas-stream containing 150–500 ppm of phosphine in air and nitrogen was sparged at a rate of about 280–320 mL per minute into a volume of 20–25 mL of a scrubber solution. The contact-distance for gas and liquid was approximately 8 cm. Influent and effluent phosphine levels were established by the use of a Bedfont EC-80 phosphine monitor.

To determine whether a potential assistant metal had any effect in prolonging the effective scrubbing life of a silver nitrate solution, a series of experiments were run employing the following standard conditions:

6.61 grams of 31.3% hydrogen peroxide (to give 8.6% peroxide in 24 grams)
2.02 grams (2 mL) of 0.1M silver nitrate
2 mL (weighed, catering to observed density) of 0.1M assistant metal solution containing 0.5 Molar orthophosphoric acid
Water to a total volume of about 24 mL.
The resulting system contained (in about 24 mL total volume):
60.82 millimoles of hydrogen peroxide
0.2 millimoles of silver ion
0.2 millimoles of assistant metal
1.0 millimoles of orthophosphoric acid.
The approximate concentrations were:
2,534 molar hydrogen peroxide
0.0083 molar (8.3 millimolar) silver ion
0.0083 molar (8.3 millimolar) assistant metal
0.0417 molar (41.7 millimolar) orthophosphoric acid.

To be deemed effective enough for further consideration, a sparger system needed to scrub phosphine without significant breakthrough for the duration of the process, typically 2 or more hours. The assistant metals which met the criterion of zero breakthrough were vanadium, tungsten, molybdenum, and titanium.

The other examined metals prolonged the time period before breakthrough occurred relative to the system without assistant metals, but could not prevent breakthrough. This signified that precipitation of silver was occurring, and that the kinetics of the reoxidation was too slow for these metals to maintain a level of silver in solution adequate to prevent breakthrough of phosphine. The metals involved were capable of catalyzing the reoxidation of silver to varying extents, but at rates too slow to be useful at high flow rates of gas and liquid, or with low ratios of recirculating liquid to gas counterflow. Of these secondary candidate metals, niobium was the best performer, followed by uranium and tantalum.

To differentiate the relative efficiencies of the four successful metal candidates, sparging experiments were conducted according to the conditions specified above, but using only a limited but identical proportion of hydrogen peroxide (about four oxidation equivalents), designed for consumption within an hour of operation. Under these conditions, the most efficient catalyst consumes the greatest proportion of the available hydrogen peroxide, before permitting breakthrough of phosphine into the effluent gas stream. With the phosphine being applied at a constant rate for each of the metals, this translates into the longest observed time before breakthrough. Under these test conditions, tungsten is the most efficient catalyst, followed by vanadium, molybdenum and titanium in the listed order.

The above described sparger systems indicate that most of the oxidation-capacity of the hydrogen peroxide present can be utilized by these metals. Tungsten is capable of utilizing a higher proportion of the total available oxidizing capacity of the system, before allowing phosphine breakthrough, than any of the other metals examined. The comparative data demonstrate that tungsten is maximally efficient in reoxidizing silver metal, at any given hydrogen peroxide concentration, since it is able to delay phosphine breakthrough longer than the other metals tested.

Vanadium functions longer than molybdenum before breakthrough occurs, but has a lower ultimate capacity for phosphine. This occurs despite the presence of higher intrinsic oxidation-power for vanadium(V), than for the other systems which rely solely on the hydrogen peroxide to provide oxidation capability. This apparent lower capacity for phosphine may be due to a competing decomposition reaction for hydrogen peroxide that vanadium in particular catalyzes. This decomposition side-reaction limits the oxidation-capacity of vanadium, relative to the other successful metal candidates. Titanium is the least satisfactory of the four metals tested.

Molybdenum systems run extremely dark, with copious separation of dark solids. Tungsten is the best performer, particularly at high acidities. Tungsten, molybdenum and titanium differ from vanadium in causing only slow decomposition of hydrogen peroxide, even in the presence of strong acid.

INVENTION COMPOSITION AND PROCESS EMBODIMENTS

Phosphine typically is employed for fumigation at levels between about 200–500 ppm. Standard scrubbing equipment, employing typical ratios of gas flow to liquid counterflow, can handle this level of phosphine with silver ion concentrations of about 0.05 molar, provided that the silver content is kept in a silver(I) ion oxidation state.

In the following Examples 1–17, a standard four-foot tall two-inch diameter Pyrex glass column, with a perforated Teflon plate at the bottom to support the packed bed, was packed with ¾ inch polypropylene Raschig RALU® RINGS. The column ran into a 2-Liter multi-necked round-bottom flask, equipped with gas and liquid inlets, liquid outlets, thermometer, and magnetic stirring. The solution was recirculated to the top of the column via a peristaltic pump. Gas flows were typically tested at a rate of 16 Liters per minute of air containing 500 ppm of phosphine. Liquid counterflows varied, up to a maximum of 336 mL per minute. The effluent phosphine levels were determined with a Bedfont EC-80 Phosphine Monitor. Ambient laboratory temperature was generally about 23° C., and unless otherwise noted, the systems were run at ambient temperature. For those systems designed to mimic hot-weather conditions (e.g., 41° C.), a water bath was employed to heat the reservoir contents above ambient temperature.

Brown solids that can be mildly explosive when dry occasionally were observed to form in some of these systems when actively scrubbing phosphine. The presence of phosphoric acid prevents such solids from drying out while the system is in use, since phosphoric acid is a non-volatile liquid. The formation of such solids is diminished or eliminated in the presence of strong mineral acids such as nitric acid or sulfuric acid which are added for this purpose and for facilitating later cleanup.

EXAMPLE 1

A scrubber solution (1000 mL) was prepared with the following ingredients:
silver nitrate—8.51 grams (0.0501 mole)
iron(III) nitrate nonahydrate—4.04 grams (0.01 mole)
70.4–70.8% nitric acid—91.94 grams (1.029 moles)
85% orthophosphoric acid—58.60 grams (0.508 mole)
35.27% hydrogen peroxide—196.23 grams (2.035 moles)
Distilled water to bring the total volume to 1000.0 mL
The solution weighed 1088.79 grams.

The solution was prepared by adding the nitric acid to a portion of the water, followed by the iron(III) nitrate with the formation of a pale yellow solution. The solution changed to pale violet when orthophosphoric acid was added. This was followed by the addition of hydrogen peroxide, and silver nitrate dissolved in the remaining portion of water.

The solution was essentially colorless, and evolved oxygen only slowly at ambient temperature (about 23° C.). At a liquid counterflow of 336 mL/minute, the solution scrubbed all of the phosphine from 500 ppm influent at a gas flow of 16 L/minute, for the one hour duration of the process at 21.8°–23° C., and for a further hour duration at 41.5°–41.8° C. The solution and column became dark as soon as phosphine was introduced to the scrubber system. The working solution became dark brown while in use. In both procedures, dark solids precipitated within the solution and on the column. When phosphine contact ceased, the precipitate gradually dissolved, and the dark brown color of the working solution gradually faded. On standing at 43° C., the solution changed back to colorless, as most of the solids redissolved.

At the beginning of the preparation, the calculated content of hydrogen peroxide was 6.357% (w/w). The system was assayed for hydrogen peroxide at the end of the hour's run at 21.8°–23° C. (Found: 5.37%), at the end of the 41.5°–48.8° C. run (Found: 4.00%), and again after about 17 hours (Found: 2.39%).

EXAMPLE 2 silver nitrate—8.50 grams (0.0500 mole)
sodium tungstate dihydrate—3.31 grams (0.0100 mole)
85.5% orthophosphoric acid—57.58 grams (0.502 mole)
10% hydrogen peroxide—358.85 grams (1.055 moles)
Distilled water to bring the total volume to 1000 mL
The solution weighed 1045.95 grams.

The order of admixture was to dissolve the sodium tungstate in some of the water, then add the orthophosphoric acid, followed by the hydrogen peroxide, and silver nitrate dissolved in some of the water.

The solution was effective in a phosphine scrubbing procedure. At a liquid counterflow of 60 mL/minute, 481–500 ppm influent phosphine (at total gas flow of 16 L/minute) gave no detectable phosphine effluent for the 54 minute duration of the process. The column dark zone reached 27–30 inches.

Minor quantities of brown crystalline solids formed in solution while in use. These tended to redissolve upon prolonged contact with the solution, once the phosphine contact had been discontinued. The solids were mildly explosive when dry.

EXAMPLE 3 silver nitrate—8.50 grams (0.0500 mole)
ammonium metavanadate—0.585 grams (0.00500 mole)
85.5% orthophosphoric acid—57.39 grams (0.501 mole)
30% hydrogen peroxide—114.83 grams (1.013 moles)
Distilled water to bring the total volume to 1000 mL
The solution weighed 1042.41 grams.

The ammonium metavanadate was dissolved in about 100 mL of boiling water, and treated with the orthophosphoric acid. The resulting solution was cooled, then diluted with water, treated with the hydrogen peroxide, and the aqueous silver nitrate.

This solution was effective for scrubbing phosphine from a gas stream. At a liquid counterflow of 60 mL/minute, 500 ppm influent phosphine (at total gas flow of 16 L/minute) gave no detectable phosphine effluent for the 60 minute duration of the process. The column dark zone reached 33–34 inches.

The scrubber solution initially is pale yellow in color (diperoxovanadium species), and turns a reddish brown (monoperoxovanadium species) while actively contacting phosphine. Once phosphine contact ceases, the yellow color is gradually restored.

EXAMPLE 4 silver nitrate—8.50 grams (0.0500 mole)
sodium molybdate dihydrate—4.84 grams (0.0200 mole)
85.5% orthophosphoric acid—57.47 grams (0.501 mole)
hydrogen peroxide—133.08 grams of 10%, 69.70 grams of 30% (1.006 moles)
Distilled water to bring the total volume to 1000 mL
The solution weighed 1045.85 grams.

The sodium molybdate was dissolved in some of the water, then the orthophosphoric acid was added, followed by the hydrogen peroxide, and silver nitrate dissolved in some of the water.

The solution was effective for scrubbing phosphine from a gas stream. At a liquid counterflow of 60 mL/minute, 500 ppm influent phosphine (at total gas flow of 16 L/minute) gave no detectable phosphine effluent for the 60 minute duration of the process. The column dark zone reached 28 inches. A large quantity of black sludge formed while this scrubber system was in use, and the solids were slower to redissolve than for comparable tungsten-based systems.

EXAMPLE 5 silver nitrate—8.50 grams (0.0500 mole)
ammonium metavanadate—1.175 grams (0.0100 mole)
85.5% orthophosphoric acid—57.45 grams (0.501 mole)
30% hydrogen peroxide—227.66 grams (2.008 moles)
Distilled water to bring the total volume to 1000 mL
The solution weighed 1053.63 grams.

The ammonium metavanadate was dissolved in about 100 mL of boiling water, and treated with the orthophosphoric acid. The resulting solution was cooled, then diluted with water, treated with the hydrogen peroxide, and aqueous silver nitrate.

The solution was effective for scrubbing phosphine from a gas stream. At a liquid counterflow of 336 mL/minute, 500 ppm influent phosphine (at total gas flow of 16 L/minute) gave no detectable phosphine effluent for the 72 minute duration of the process. The column dark zone reached 15–16 inches. When 600 mL of the solution was withdrawn from the reservoir, complete phosphine removal from the influent still occurred for an additional 204 minutes of observation.

EXAMPLE 6 silver nitrate—8.52 grams (0.0502 mole)
ammonium metavanadate—0.59 grams (0.00504 mole)
sodium tungstate dihydrate—1.65 grams (0.00500 mole)
85.5% orthophosphoric acid—57.35 grams (0.500 mole)
30% hydrogen peroxide—226.79 grams (2.000 moles)
Distilled water to bring the total volume to 1000 mL
The solution weighed 1054.55 grams.

The sodium tungstate was dissolved in part of the water, and treated with about half of the orthophosphoric acid. Separately, the ammonium metavanadate was dissolved in about 100 mL of boiling water, and treated with the remaining part of the orthophosphoric acid. The resulting solution was cooled, and added to the tungsten-containing solution. The combined solution was diluted with water, and then treated with the hydrogen peroxide, and aqueous silver nitrate.

The solution was effective for scrubbing phosphine from a gas stream. At a liquid counterflow of 336 mL/minute, 500 ppm influent phosphine (at total gas flow of 16 L/minute) gave no detectable phosphine effluent for the 80 minute duration of the process. The column dark zone reached 15–16 inches.

EXAMPLE 7 silver nitrate—8.50 grams (0.0500 mole)
ammonium metavanadate—0.39 grams (0.00333 mole)
sodium tungstate dihydrate—2.20 grams (0.00667 mole)
85.5% orthophosphoric acid—57.77 grams (0.504 mole)
30% hydrogen peroxide—227.00 grams (2.002 moles)
Distilled water to bring the total volume to 1000 mL
The solution weighed 1056.50 grams.

The sodium tungstate was dissolved in part of the water, and treated with about half of the orthophosphoric acid. Separately, the ammonium metavanadate was dissolved in about 100 mL of boiling water, and treated with the remaining part of the orthophosphoric acid. The resulting solution was cooled, and added to the tungsten-containing solution. The combined solution was diluted with water, and then treated with the hydrogen peroxide, and aqueous silver nitrate.

The solution was effective for scrubbing phosphine from a gas stream. At a liquid counterflow of 336 mL/minute, 500 ppm influent phosphine (at total gas flow of 16 L/minute) gave no detectable phosphine effluent for the 109.5 minute duration of the process. The column dark zone reached 16–18 inches.

EXAMPLE 8 silver nitrate—8.50 grams (0.0500 mole)
ammonium metavanadate—0.78 grams (0.00667 mole)
sodium tungstate dihydrate—1.105 grams (0.00335 mole)
85% orthophosphoric acid—58.14 grams (0.504 mole)
35.27% hydrogen peroxide—193.20 grams (2.003 moles)
Distilled water to bring the total volume to 1000 mL
The solution weighed 1051.54 grams.

The sodium tungstate was dissolved in part of the water, and treated with about half of the orthophosphoric acid. Separately, the ammonium metavanadate was dissolved in about 100 mL of boiling water, and treated with the remaining part of the orthophosphoric acid. The resulting solution was cooled, and added to the tungsten-containing solution.

The combined solution was diluted with water, and then treated with the hydrogen peroxide, and aqueous silver nitrate. The solution was transferred to a 1000 mL volumetric flask and diluted to the mark with distilled water.

The solution was effective for scrubbing phosphine from a gas stream. At a liquid counterflow of 336 mL/minute, 500 ppm influent phosphine (at total gas flow of 16 L/minute) gave no detectable phosphine effluent for the 107.5 minute duration of the process. The column dark zone reached 20–21 inches.

EXAMPLE 9 silver nitrate—8.52 grams (0.0502 mole)
vanadyl sulfate trihydrate (lot assay: 23.6% as vanadium metal)—1.46 grams (0.00676 mole)
sodium tungstate dihydrate—1.105 grams (0.00335 mole)
85% orthophosphoric acid—58.26 grams (0.505 mole)
35.27% hydrogen peroxide—194.36 grams (2.015 moles)
Distilled water to bring the total volume to 1000 mL
The solution weighed 1050.76 grams.

The sodium tungstate was dissolved in some of the water. The orthophosphoric acid and hydrogen peroxide were added, followed by the silver nitrate dissolved in some of the water. Aqueous vanadyl sulfate solution was added just before use of the solution. Vanadyl sulfate dissolves more readily in water than ammonium metavanadate.

The solution was effective for scrubbing phosphine from a gas stream at 20° C. At a liquid counterflow of 336 mL/minute, 500 ppm influent phosphine (at total gas flow of 16 L/minute) gave no detectable phosphine effluent for the 107.7 minute duration of the process. The column dark zone reached 20–21 inches.

The solution also was found effective in a further endurance run of over 24 hours. Hydrogen peroxide (101.5 mL, 113.94 grams, 35.27%) was added initially, followed by increments of 55.46 grams (at t=4 hours), 57.69 grams (at t=8 hours), 56.82 grams (at t=12 hours), 56.56 grams (at t=16 hours), 57.04 grams (at t=20 hours). At a liquid counterflow of 336 mL/minute, 500 ppm influent phosphine (at total gas flow of 16 L/minute) gave no detectable phosphine effluent for the 25 hour duration of the experiment. The column dark zone remained steady at 21–22 inches for the duration of the run.

EXAMPLE 10 silver nitrate—8.50 grams (0.0500 mole)
vanadyl sulfate trihydrate—0.072 grams (0.000333 mole)
sodium tungstate dihydrate—0.055 grams (0.000167 mole)
85% orthophosphoric acid—57.65 grams (0.500 mole)
35.27% hydrogen peroxide—221.49 grams (2.297 moles)
Distilled water to bring the total volume to 1000 mL
The solution weighed 1057.75 grams.

The sodium tungstate was dissolved in some of the water, then the orthophosphoric acid, hydrogen peroxide, and aqueous silver nitrate were added to the solution. Aqueous vanadyl sulfate was added just before use.

The solution was effective for scrubbing phosphine from a gas stream at 39° C. At a liquid counterflow of 336 mL/minute, 500 ppm influent phosphine (at total gas flow of 16 L/minute) gave no detectable phosphine effluent for the 121 minute duration of the process. The column dark zone reached 22–23 inches.

The diminished levels of assistant metals (particularly vanadium) were found to be advantageous for minimizing the decomposition of hydrogen peroxide at elevated temperatures.

EXAMPLE 11 silver nitrate—8.50 grams (0.0500 mole)
sodium tungstate dihydrate—3.315 grams (0.0100 mole)
85% orthophosphoric acid—11.61 grams (0.101 mole)
70.4% nitric acid—90.56 grams (1.012 mole)
35.27% hydrogen peroxide—193.30 grams (2.004 moles)
Distilled water to bring the total volume to 1000 mL
The solution weighed 1067.95 grams.

The sodium tungstate was dissolved in some of the water, then the orthophosphoric acid, hydrogen peroxide, nitric acid, and aqueous silver nitrate were added.

The solution was effective for scrubbing phosphine from a gas stream at 41° C. At a liquid counterflow of 336 mL/minute, 500 ppm influent phosphine (at total gas flow of 16 L/minute) gave no detectable phosphine effluent for the 120 minute duration of the process. The column dark zone reached 16–17 inches.

The initial concentration of hydrogen peroxide calculated as 6.384%. At the end of the two hour run, the solution assayed 5.32% hydrogen peroxide. Sixteen hours later, the solution was assayed again. The portion kept at ambient temperature (about 23.5° C.) assayed 4.50%. The portion which had recirculated through the column all night at 44° C., in the absence of phosphine or other gas flow, assayed 3.93%.

Higher levels of co-catalyst metals can be tolerated at elevated temperatures if the co-catalyst metal is only tungsten. This type of system is especially adapted for use under hot weather conditions. This system is advantageous because the formation of solids is minimal, and any formed solids are quickly redissolved once phosphine contact ceases.

EXAMPLE 12 silver nitrate—8.50 grams (0.0500 mole)
sodium tungstate dihydrate—3.31 grams (0.0100 mole)
85% orthophosphoric acid—11.98 grams (0.104 mole)
96.3% sulfuric acid—51.32 grams (0.504 mole)
35.27% hydrogen peroxide—193.02 grams (2.001 moles)
Distilled water to bring the total volume to 1000 mL
The solution weighed 1065.64 grams.

The sodium tungstate was dissolved in some of the water, then the orthophosphoric acid, hydrogen peroxide, sulfuric acid, and aqueous silver nitrate were added.

The solution was effective for scrubbing phosphine from a gas stream at 41° C. At a liquid counterflow of 336 mL/minute, 500 ppm influent phosphine (at total gas flow of 16 L/minute) gave no detectable phosphine effluent for the 120 minute duration of the process. The column dark zone reached 16–17.5 inches.

EXAMPLE 13 silver nitrate—8.52 grams (0.0502 mole)
sodium tungstate dihydrate—3.315 grams (0.0100 mole)
70.4% nitric acid—45.44 grams (0.508 mole)
35.27% hydrogen peroxide—194.19 grams (2.013 moles)
Distilled water to bring the total volume to 1000 mL
The solution weighed 1046.58 grams.

The sodium tungstate was dissolved in some of the water, then the hydrogen peroxide, nitric acid, and aqueous silver nitrate were added.

The solution was effective for scrubbing phosphine from a gas stream at 41° C. At a liquid counterflow of 336 mL/minute, 500 ppm influent phosphine (at total gas flow of 16 L/minute) gave no detectable phosphine effluent for the 121 minute duration of the process. The column dark zone reached 15–16 inches.

The solution also was effective for scrubbing phosphine at 20° C., but with significantly slower kinetics than at 41° C. This was reflected in the presence of a more extensive dark zone in the scrubber, and in a slower rate of redissolution of suspended solids. The solids which separated out of solution during the contact with phosphine, redissolved with stirring in the absence of phosphine.

EXAMPLE 14 silver nitrate—8.50 grams (0.0500 mole)
sodium tungstate dihydrate—3.305 grams (0.0100 mole)
70.4% nitric acid—90.495 grams (1.011 mole)
35.27% hydrogen peroxide—196.83 grams (2.041 moles)
85% orthophosphoric acid—692.725 grams (6.009 moles)
Distilled water to bring the total volume to 1000 mL
The solution weighed 1351.90 grams.

The sodium tungstate was dissolved in minimal water (about 30 mL), then the orthophosphoric acid, nitric acid, hydrogen peroxide, and aqueous silver nitrate were added. Despite the high concentrations of acid, the hydrogen peroxide was relatively stable.

The solution was effective for scrubbing phosphine for a gas stream at 40.5° C. At a liquid counterflow of 336 mL/minute, 500 ppm influent phosphine (at total gas flow of 16 L/minute) gave no detectable phosphine effluent for the 60 minute duration of the process. The column dark zone reached 18 inches, but was very weak beyond 9–10 inches.

This experiment modeled the behavior of a much-reused scrubber solution, and suggested that phosphoric acid can be permitted to accumulate to concentrations in excess of 6 molar (i.e., as high as 9 molar), before it is necessary to replace the solution (and its contained metals) with fresh reagents.

EXAMPLE 15 silver sulfate—7.81 grams (0.02505 mole)
sodium tungstate dihydrate—3.30 grams (0.0100 mole)
85% orthophosphoric acid—12.59 grams (0.109 mole)
96.3% sulfuric acid—102.00 grams (56.5 mL) (1.002 moles)
35.27% hydrogen peroxide—196.47 grams (2.037 moles)
Distilled water to bring the total volume to 1000 mL
The solution weighed 1096.56 grams.

A.

The sodium tungstate was dissolved in minimal water, then the orthophosphoric acid was added. Separately, silver sulfate was suspended in water with stirring, and the sulfuric acid was added gradually, and the solution was diluted with water to about 500 mL. The silver sulfate solution was added to the phosphotungstic acid solution, followed by the addition of the hydrogen peroxide.

The solution (at 336 mL/minute of liquid counterflow) completely removed phosphine from 500 ppm influent in air (16 Liters per minute flow rate) at 40.5° C. for the duration of the procedure (64 minutes). Column appearance closely resembled the other strong-acid tungsten systems, and the solution recirculated clear and colorless, becoming a light tan in the lower column and reservoir.

The solution was designed to be nitrate-free, and thus contained no strong acids that could volatilize while in use. The silver content was limited in the sulfuric acid system by the relatively low solubility of silver sulfate.

B.

The above-described scrubber solution (25 grams) in a sparger unit removed essentially all of the arsine content from an influent gas flow (270–300 mL/minute of 530 ppm arsine in nitrogen) over a 30 minute period.

C.

The above-described scrubber solution (25 grams) in a sparger unit removed essentially all of the hydrogen sulfide content from an influent gas flow (270–340 mL/minute of 519 ppm hydrogen sulfide in nitrogen) over a period of 180 minutes.

D.

A scrubber solution was prepared by dissolving 0.1M silver nitrate (2.05 grams) and 35.27% hydrogen peroxide (6.64 grams) in water (to a total of 24 grams of solution). The solution in a sparger unit was effective for complete removal of 530 ppm of arsine in a nitrogen influent gas flow over a period of 180 minutes. A dark precipitate formed in the solution during the influent scrubbing cycle.

EXAMPLE 16 silver nitrate—8.51 grams (0.0501 mole)
sodium molybdate dihydrate—2.42 grams (0.0100 mole)
85% orthophosphoric acid—58.08 grams (0.504 mole)
70.8% nitric acid 91.02 grams (1.023 moles)
35.27% hydrogen peroxide—196.74 grams (2.040 moles)
Distilled water to bring the total volume to 1000.0 mL
The resulting solution weighed 1088.55 grams.

The sodium molybdate dihydrate was dissolved in a portion of the water, then the orthophosphoric acid, nitric acid, hydrogen peroxide and aqueous silver nitrate were added.

This solution scrubbed phosphine completely from 500 ppm influent (16 L/minute) at a 338 mL/minute rate of liquid counterflow at 20°–21° C. over a 60 minute period. The solution darkened while in use, and black flocculent solids recirculated as a suspension in the solution. At the end of the run, heating was applied over 30–40 minutes. The color faded, and most of the solids redissolved.

After 80 minutes of warming, phosphine contact was resumed. The solution scrubbed phosphine completely from 500 ppm influent (16 L/minute) at a 338 mL/minute rate of liquid counterflow at 39°–40° C. over a 60 minute period. At the end of the second run, the solution was assayed for hydrogen peroxide; found: 5.68%. After standing for three days at room temperature, the solution assayed 5.43% hydrogen peroxide.

EXAMPLE 17 silver nitrate—8.50 grams (0.0500 mole)
titanium oxysulfate-sulfuric acid complex—2.44 grams (0.0101 mole) (lot assayed 19.8% titanium as metal)
85% orthophosphoric acid—57.67 grams (0.500 mole)
70.8% nitric acid—90.87 grams (1.021 moles)
35.27% hydrogen peroxide—194.73 grams (2.019 moles)
Distilled water to bring the total volume to 1000.0 mL
The resulting solution weighed 1088.29 grams.

The orthophosphoric acid and the nitric acid were diluted with water and combined, and the hydrogen peroxide was added to the solution. The titanium oxysulfate-sulfuric acid complex then was added with stirring, followed by aqueous silver nitrate.

The solution (at 336 mL/minute of liquid counterflow) completely removed phosphine from 500 ppm influent in air (16 Liters per minute flow rate) at 22°–23° C. over a 60 minute period. The solution (at 336 mL/minute of liquid counterflow) also completely removed phosphine from 500 ppm influent in air (16 Liters per minute flow rate) at 39°–40° C. over a 64 minute period. At the higher temperature, the solution appeared lighter in color, and the column dark zone was somewhat compacted. Once phosphine contact ceased, the solids gradually redissolved within the solution and from the column packing, and the original clear bright orange color was restored.

At the end of the two procedures, the solution was analyzed for hydrogen peroxide; found: 5.58%. After recirculating overnight for about 17 hours at about 40° C., the solution was analyzed again; found: 5.53%. After three more days at room temperature, the solution assayed 5.60% hydrogen peroxide.

EXAMPLE 18

This Example illustrates a scale-up process embodiment in accordance with the present invention.

A 36,000 cubic foot fumitorium was charged with phosphine to 352 ppm, and scrubbed with a 6-inch diameter column packed to a bed-depth of about 48 inches with 1.5 inch Raschig polypropylene RALU® rings.

The scrubber solution (10 Liters) had the following content:
35.91 grams of silver nitrate (0.800 mole)
11.01 grams of sodium tungstate dihydrate (0.0334 mole)
14.42 grams of vanadyl sulfate trihydrate (0.0668 mole)
343 mL of 85% orthophosphoric acid (5.013 moles)
1708 mL of 35% hydrogen peroxide (19.848 moles)
7900 mL of distilled water.

With a gas flow-rate of 55 cubic feet per minute, a liquid counterflow rate of 1.0 to 1.25 gallons per minute, and an ambient temperature of up to 80° F., phosphine influents of 352 ppm were scrubbed down to 6 to 13 ppm. At slightly lower gas flows (45 to 50 cfm), there was no phosphine breakthrough. The fumitorium was scrubbed down to 137 ppm over 7 hours.

The initial transparent pale-yellow scrubber solution turned reddish brown while contacting phosphine, and finely divided reddish-brown solids separated during the process. The solids did not interfere with the effectiveness of the phosphine removal from the gas stream. Once contact with phosphine ceased, the solids gradually redissolved, and the pale yellow color was restored.

EXAMPLE 19

This Example illustrates the scrubbing of the atmospheric content of phosphine in two commercial warehouses (440,000 cubic feet) employing a sprayer mode (for A.) and a packed-bed mode (for B.) respectively in accordance with the present invention.

A.

The scrubber solution (85 gallons) had the following content:
2733.5 grams of silver nitrate (16.091 moles)
1061.77 grams of sodium tungstate dihydrate (3.219 moles)
10 Liters of 70% nitric acid (155.524 moles)
56 Liters of 35% hydrogen peroxide (650.763 moles)
255 Liters of deionized water.

Calculations relating to the consumption of phosphine, hydrogen peroxide, and the production of orthophosphoric acid assumed a constant pressure of one atmosphere, and a constant temperature of 28.5° C. (85.1° F.).

A scrubber-tower housing, 30 inches in diameter and about 48 inches tall in effective scrubber volume, was fitted with an array of 10 sprayer nozzles. Liquid was circulated through the packed bed at a rate of 25 gallons per minute. In this configuration, over a period of 196 minutes, at gas flows of 1000–1100 cubic feet per minute, the scrubber reduced the warehouse ambient phosphine level from 292 ppm to 202 ppm. Cumulative air through the scrubber amounted to 211,900 cubic feet. Effluent phosphine levels ranged from 0 to 10 ppm during the run. During the run, 1973 grams of phosphine was absorbed, producing 5686 grams of orthophosphoric acid [at a concentration of 1.692% (calculated) or 1.233% (assayed)]. Equivalent consumption of hydrogen peroxide amounted to 7894 grams (100% basis), or 19.98 Liters of 35% hydrogen peroxide. Two hours into the run, 10 gallons of deionized water were added to replace evaporation loss.

The scrubber tower was reconfigured using two wide-bore spray nozzles (12.5 gallons per minute per nozzle), and scrubbing was resumed. Over 350 minutes, at a gas flow of 1000 cfm, the scrubber reduced the warehouse ambient phosphine concentration from 207 to 93 ppm. Total gas processed came to 350,000 cubic feet. Effluent phosphine levels ranged from 0 to 10 ppm. During the run, 1692 grams of phosphine was absorbed, producing 4876 grams of orthophosphoric acid; this increased the concentration of orthophosphoric acid in solution to 3.143% (calculated) or 2.683–3.126% (assayed). Equivalent consumption of hydrogen peroxide amounted to 6770 grams (100% basis) or 17.13 Liters of 35% hydrogen peroxide.

Two hours into the second run, an additional 10 Liters of 70% nitric acid were added to the system. After about four hours of operation, additional 35% hydrogen peroxide (26 Liters) was added.

When operated in a sprayer mode, the system did not produce solids. During the process, the solution was light tan or brown in color. Once phosphine contact ceased, the solution reverted to colorless within about 5 minutes.

B.

The solution from the previous run was employed:
2733.5 grams of silver nitrate (16.091 moles)
1061.77 grams of sodium tungstate dihydrate (3.219 moles)
20 Liters of 70% nitric acid (311.048 moles)
82 Liters of 35% hydrogen peroxide (952.904 moles) [37.11 liters (431.247 moles) calculated to have been consumed by the phosphine absorbed in the sprayer runs]
255 Liters of deionized water.

Accumulated phosphoric acid from the two sprayer runs was estimated to be 10562 grams (100% basis) at the outset of this procedure, which is 3.143% (w/w, calculated) or 3.126% (w/w, assayed). Cumulative evaporative losses kept the volume of all of the above to around 85 gallons.

A scrubber-column (30 inches in diameter and a bed-depth of about 48 inches) was packed with 1.5 inch Raschig polypropylene RALU® rings. Liquid was recirculated at a rate of 25 gallons per minute. Gas flows were maintained at about 1050 cfm (with a 1000 cfm–1150 cfm range). The system, at an ambient temperature of 85°–95° F., scrubbed phosphine completely from the fumigation atmosphere. Over a period of about 20 hours, and with three to four change-overs of warehouse air, the phosphine concentration within the warehouse was reduced from 238 ppm to 10 ppm. The effluent contained zero phosphine, as measured by high-sensitivity Draeger Tubes.

During the process, the hydrogen peroxide content was analyzed (permanganate titration) every two hours, and further hydrogen peroxide added whenever the concentration fell below 4%. Hydrogen peroxide was maintained in the 4–6.5% range. Water was added as required to replace evaporation loss.

From an initial content of 5.1% hydrogen peroxide, an additional 60 Liters of 35% hydrogen peroxide were added, in 20 Liter increments at 2 hours, 8 hours, and 16 hours of the operation period. The final concentration of hydrogen peroxide was 5.93%. 100 Liters of water were added in five 20-Liter increments to replace evaporative losses, at 4, 6, 10, 12, and 18 hours of the operation period.

A 4803 gram total of phosphine was absorbed, generating 13,844 grams of orthophosphoric acid (100% basis). This consumed 19,222 grams of hydrogen peroxide (100% basis) or 48.64 Liters of 35% hydrogen peroxide. A total of 1,583,366.5 cubic feet of air was processed.

For the two warehouses, a total of 8467 grams of phosphine was absorbed, with the formation of 24,407 grams of orthophosphoric acid (100% basis). This corresponds to a calculated final concentration of 7.264% (w/w) orthophosphoric acid in the final scrubber solution. Cumulative consumption was 33887 grams (100% basis) or 85.76 liters of 35% hydrogen peroxide. Total air scrubbed by the two systems was 2,145,266 cubic feet.

The assayed value at the end of the runs was 6.327% (w/w) of orthophosphoric acid. Discrepancies between calculated and found analyses are typical for these types of reaction systems because of operating factors.

C.

A scrubber solution similar to that described above was employed for removal of hydrogen sulfide from a gas-phase stream. The scrubber solution was composed of 0.05M silver nitrate, 0.01M sodium tungstate, 1.0M nitric acid and 2.0M hydrogen peroxide.

The scrubber solution (25 grams) in a sparger unit was effective for complete removal of 519 ppm hydrogen sulfide from a nitrogen influent stream (at 320–330 mL per minute) over a period of 150 minutes. The scrubber solution remained colorless and no solids precipitated during the influent scrubbing cycle.

What is claimed is:

1. A process for liquid scrubbing of a phosphine-containing gas-phase which comprises (1) forming a gas-phase stream from a contaminated gas-phase volume which has a content of phosphine; (2) contacting the gas-phase stream with an aqueous solution which contains redox-effective quantities of (a) silver(I) oxidation catalyst, (b) hydrogen peroxide, (c) silver metal-reoxidation co-catalyst ingredient which forms a chelate with said hydrogen peroxide, and (d) an oxidation-resistant acid; and (3) recovering a purified gas-phase stream which has a reduced content of phosphine contamination.

2. A process in accordance with claim 1 wherein the contaminated gas-phase stream initially has a content between about 0.3–17,900 ppm of phosphine.

3. A process in accordance with claim 1 wherein the concentration of silver(I) catalyst is between about 0.001–10 molar.

4. A process in accordance with claim 1 wherein the concentration of silver(I) catalyst is between about 0.02–0.2 molar.

5. A process in accordance with claim 1 wherein the silver(I) catalyst is provided by at least one chemical species selected from silver nitrate, silver sulfate, silver fluoride, silver oxide, silver carbonate, silver phosphate, silver perchlorate, silver tetrafluoroborate, and silver metal.

6. A process in accordance with claim 1 wherein the concentration of hydrogen peroxide is between about 0.01–18 molar.

7. A process in accordance with claim 1 wherein the concentration of hydrogen peroxide is between about 0.5–5 molar.

8. A process in accordance with claim 1 wherein the co-catalyst is at least one species selected from the group consisting of tungsten(VI), vanadium(V), vanadium(IV), molybdenum(VI), titanium(IV), niobium(V), iron(III) and uranium(VI) compounds.

9. A process in accordance with claim 1 wherein the concentration of co-catalyst ingredient provides between about 0.0001–0.3 gram-atoms per Liter of metal ions.

10. A process in accordance with claim 1 wherein the concentration of co-catalyst ingredient provides between about 0.001–0.05 gram-atoms per Liter of metal ions.

11. A process in accordance with claim 1 wherein the concentration of co-catalyst ingredient is between about 0.003–0.05 gram-atoms per Liter of tungsten(VI) provided by at least one compound selected from the group consisting of sodium tungstate dihydrate, tungsten trioxide, tungstic acid, and phosphotungstic acid.

12. A process in accordance with claim 1 wherein the concentration of co-catalyst ingredient is between about 0.001–0.02 gram-atoms per Liter of vanadium(V or IV) provided by at least one compound selected from the group consisting of vanadyl sulfate, ammonium metavanadate, divanadium pentoxide, and vanadium phosphate.

13. A process in accordance with claim 1 wherein the concentration of co-catalyst ingredient is between about 0.002–0.05 gram-atoms per Liter of molybdenum(VI) provided by at least one compound selected from the group consisting of sodium molybdate dihydrate, molybdenum trioxide, phosphomolybdic acid, ammonium molybdate, and molybdic acid.

14. A process in accordance with claim 1 wherein the concentration of co-catalyst ingredient is between about 0.002–0.05 gram-atoms per Liter of titanium(IV) provided by titanium oxysulfatesulfuric acid complex.

15. A process in accordance with claim 1 wherein the oxidation-resistant acid is at least one reagent selected from the group consisting of orthophosphoric acid, sulfuric acid and nitric acid.

16. A process in accordance with claim 1 wherein the oxidation-resistant acid ingredient comprises at least orthophosphoric acid in a concentration between about 0.01–9 molar.

17. A process in accordance with claim 1 wherein the oxidation-resistant acid ingredient comprises at least sulfuric acid in a concentration between about 0.05–2 molar.

18. A process in accordance with claim 1 wherein the oxidation-resistant acid ingredient comprises at least nitric acid in a concentration between about 0.1–4 molar.

19. A process for liquid scrubbing of a hydrogen sulfide-containing gas-phase which comprises (1) forming a gas-phase stream from a contaminated gas-phase volume which has a content of hydrogen sulfide; (2) contacting the gas-phase stream with an aqueous solution which contains redox-effective quantities of (a) silver(I) oxidation catalyst, (b) hydrogen peroxide, (c) silver metal-reoxidation co-catalyst ingredient which forms a chelate with said hydrogen peroxide, and (d) an oxidation-resistant acid; and (3) recovering a purified gas-phase stream which has a reduced content of hydrogen sulfide contamination.

20. A process for liquid scrubbing of an arsine-containing gas-phase which comprises (1) forming a gas-phase stream from a contaminated gas-phase volume which has a content of arsine; (2) contacting the gas-phase stream with an aqueous solution which contains redox-effective quantities of (a) silver(I) oxidation catalyst, (b) hydrogen peroxide, (c) silver metal-reoxidation co-catalyst ingredient which forms a chelate with said hydrogen peroxide, and (d) an oxidation-resistant acid; and (3) recovering a purified gas-phase stream which has a reduced content of arsine contamination.

* * * * *